United States Patent
Miller et al.

(10) Patent No.: US 12,087,002 B1
(45) Date of Patent: Sep. 10, 2024

(54) SYSTEMS AND METHODS TO DETERMINE DEPTH OF SOIL COVERAGE ALONG A RIGHT-OF-WAY

(71) Applicant: MARATHON PETROLEUM COMPANY LP, Findlay, OH (US)

(72) Inventors: Luke R. Miller, Findlay, OH (US); Joshua J. Beard, Findlay, OH (US); Brittan Battles, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 18/589,714

(22) Filed: Feb. 28, 2024

Related U.S. Application Data

(60) Provisional application No. 63/540,822, filed on Sep. 27, 2023, provisional application No. 63/540,692,
(Continued)

(51) Int. Cl.
*G06T 7/50* (2017.01)
*G06T 17/05* (2011.01)

(52) U.S. Cl.
CPC ............... *G06T 7/50* (2017.01); *G06T 17/05* (2013.01); *G06T 2207/10032* (2013.01)

(58) Field of Classification Search
None
See application file for complete search history.

(56) References Cited

U.S. PATENT DOCUMENTS

| | | |
|---|---|---|
| 2,626,627 A | 1/1953 | Jung et al. |
| 2,864,252 A | 12/1958 | Schaschl |

(Continued)

FOREIGN PATENT DOCUMENTS

| | | |
|---|---|---|
| AU | 2010241217 | 11/2010 |
| AU | 2013202839 | 5/2014 |

(Continued)

OTHER PUBLICATIONS

Alexandrakis et al., "Marine Transportation for Carbon Capture and Sequestration (CCS)", Department of Civil and Environmental Engineering, Thesis, Massachusetts Institute of Technology, Jun. 2010.

(Continued)

*Primary Examiner* — Leon Viet Q Nguyen
(74) *Attorney, Agent, or Firm* — Womble Bond Dickinson (US) LLP

(57) ABSTRACT

Embodiments of systems and methods to determine depth of soil coverage for an underground feature along a right-of-way are disclosed. In an embodiment, the method may include receiving a depth of cover measurement for the right-of-way. The method may include capturing baseline images of the right-of-way within a first selected time of the depth of cover measurement. The method may include rendering a three dimensional elevation model of the right-of-way from the baseline images. The method may include georeferencing the three dimensional elevation model to generate a georeferenced three dimensional elevation model. The method may include adding the depth of cover measurement to the georeferenced three dimensional elevation model. The method may include rendering an updated three dimensional elevation model of the right-of-way from subsequently captured images. The method may include determining a delta depth of coverage based on the georeferenced and the updated three dimensional elevation model.

25 Claims, 10 Drawing Sheets

Related U.S. Application Data filed on Sep. 27, 2023, provisional application No. 63/539,039, filed on Sep. 18, 2023.

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,814,148 A | 6/1974 | Wostl |
| 3,925,592 A | 12/1975 | Webb |
| 3,961,493 A | 6/1976 | Nolan, Jr |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,072,380 A | 12/1991 | Randelman et al. |
| 5,095,977 A | 3/1992 | Ford |
| 5,129,432 A | 7/1992 | Dugger |
| 5,191,537 A | 3/1993 | Edge |
| 5,367,882 A | 11/1994 | Lievens et al. |
| 5,383,243 A | 1/1995 | Thacker |
| 5,469,830 A | 11/1995 | Gonzalez |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,628,351 A | 5/1997 | Ramsey, Jr. et al. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,887,974 A | 3/1999 | Pozniak |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,243,483 B1 | 6/2001 | Petrou et al. |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,912,924 B2 | 12/2014 | Scofield et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |
| 9,310,016 B2 | 4/2016 | Hodde |
| 9,329,066 B2 | 5/2016 | Skarping |
| 9,363,462 B2 | 6/2016 | Yoel |
| 9,388,350 B2 | 7/2016 | Buchanan |
| 9,518,693 B2 | 12/2016 | Hodde |
| 9,530,121 B2 | 12/2016 | Brauer et al. |
| 9,550,247 B2 | 1/2017 | Smith |
| 9,643,135 B1 | 5/2017 | Mazzei et al. |
| 9,945,333 B2 | 4/2018 | Kopinsky |
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |
| 10,134,042 B1 | 11/2018 | Prasad et al. |
| 10,168,255 B1 | 1/2019 | Johnsen |
| 10,196,243 B1 | 2/2019 | Wells |
| 10,197,206 B1 | 2/2019 | Dray et al. |
| 10,223,596 B1 | 3/2019 | Edwards et al. |
| 10,247,643 B1 | 4/2019 | Johnsen |
| 10,261,279 B1 | 4/2019 | Potter |
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |

(56) References Cited

U.S. PATENT DOCUMENTS

| | | |
|---|---|---|
| 10,408,377 B1 | 9/2019 | Dray et al. |
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 | 11/2020 | Tassell, Jr. |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B1 | 4/2021 | Miller |
| 10,997,707 B1 | 5/2021 | Katz et al. |
| 11,010,608 B2 | 5/2021 | Adam et al. |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,428,622 B2 | 8/2022 | Borin et al. |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,774,042 B2 | 10/2023 | Thobe |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,920,504 B2 | 3/2024 | Thobe |
| 11,965,317 B2 | 4/2024 | Jordan |
| 11,988,336 B2 | 5/2024 | Thobe |
| 12,000,538 B2 | 6/2024 | Thobe |
| 12,006,014 B1 | 6/2024 | Ernst |
| 12,011,697 B2 | 6/2024 | Miller |
| 12,012,082 B1 | 6/2024 | Pittman, Jr. |
| 12,012,883 B2 | 6/2024 | Thobe |
| 2002/0014068 A1 | 2/2002 | Mittricker et al. |
| 2002/0178806 A1 | 12/2002 | Valentine |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0176482 A1 | 8/2005 | Raisinghani et al. |
| 2005/0284333 A1 | 12/2005 | Falkiewicz |
| 2006/0125826 A1 | 6/2006 | Lubkowitz |
| 2006/0278304 A1 | 12/2006 | Mattingly et al. |
| 2007/0175511 A1 | 8/2007 | Doerr |
| 2008/0092625 A1 | 4/2008 | Hinrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2009/0009308 A1 | 1/2009 | Date et al. |
| 2009/0107111 A1 | 4/2009 | Oliver |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2010/0031825 A1 | 2/2010 | Kemp |
| 2010/0049410 A1 | 2/2010 | McKee |
| 2010/0058666 A1 | 3/2010 | Kim |
| 2010/0198775 A1 | 8/2010 | Rousselle |
| 2011/0265449 A1 | 11/2011 | Powell |
| 2012/0027298 A1 | 2/2012 | Dow |
| 2012/0092835 A1 | 4/2012 | Miller |
| 2012/0143560 A1 | 6/2012 | Tabet et al. |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0133824 A1* | 5/2014 | Yoel .................. G06F 16/29 386/201 |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0269288 A1* | 9/2015 | Moore .................. G06F 30/13 703/1 |
| 2015/0323119 A1 | 11/2015 | Giunta |
| 2016/0071059 A1* | 3/2016 | Petering .............. G06Q 10/103 705/301 |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |

(56) References Cited

U.S. PATENT DOCUMENTS

| | | |
|---|---|---|
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0140237 A1 | 5/2017 | Voeller et al. |
| 2017/0158303 A1 | 6/2017 | Michaelis et al. |
| 2017/0180012 A1 | 6/2017 | Tingler et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1 | 5/2018 | Allidieres et al. |
| 2018/0143734 A1 | 5/2018 | Ochenas et al. |
| 2018/0186528 A1 | 7/2018 | Tonn |
| 2018/0218214 A1 | 8/2018 | Pestun |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0295189 A1 | 9/2019 | Strasser |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0136060 A1 | 12/2019 | Helgason et al. |
| 2019/0368054 A1 | 12/2019 | Gummow et al. |
| 2019/0368156 A1 | 12/2019 | Faivre |
| 2020/0033252 A1 | 1/2020 | Borin et al. |
| 2020/0118413 A1 | 4/2020 | Kanukurthy et al. |
| 2020/0232191 A1 | 7/2020 | Prior |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0095380 A1 | 4/2021 | Borin et al. |
| 2021/0123211 A1 | 4/2021 | Miller et al. |
| 2021/0138399 A1 | 5/2021 | Yokoyama et al. |
| 2021/0192938 A1 | 6/2021 | Doerr et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0341092 A1 | 10/2023 | Thobe |
| 2023/0347303 A1 | 11/2023 | Miller |
| 2023/0358023 A1 | 11/2023 | Jordan et al. |
| 2023/0366510 A1 | 11/2023 | Thobe |
| 2023/0383416 A1 | 11/2023 | Ell |
| 2023/0383417 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Ell |
| 2024/0060189 A1 | 2/2024 | Ell |
| 2024/0141506 A1 | 5/2024 | Ell |
| 2024/0166492 A1 | 5/2024 | Thobe |
| 2024/0209988 A1 | 6/2024 | Thobe |

FOREIGN PATENT DOCUMENTS

| | | |
|---|---|---|
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 106764463 | 1/2019 |
| CN | 208306600 | 1/2019 |
| CN | 110513604 | 11/2019 |
| CN | 210176958 | 3/2020 |
| CN | 111537157 | 8/2020 |
| CN | 114001278 | 2/2022 |
| CN | 113719746 | 11/2022 |
| CN | 114877263 | 4/2023 |
| EP | 2458573 | 5/2012 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |

(56) References Cited

FOREIGN PATENT DOCUMENTS

| | | |
|---|---|---|
| JP | 2012002159 | 11/2014 |
| JP | 2016078893 | 5/2016 |
| KR | 20110010316 | 2/2011 |
| KR | 20130038986 | 4/2013 |
| KR | 102129951 | 7/2020 |
| KR | 102169280 | 10/2020 |
| KR | 102281640 | 7/2021 |
| RU | 2760879 | 12/2021 |
| WO | 1996006685 | 5/1996 |
| WO | 1997006004 | 2/1997 |
| WO | 1997006298 | 2/1997 |
| WO | 1998003711 | 1/1998 |
| WO | 2000063108 | 10/2000 |
| WO | 2002030551 | 4/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |
| WO | 2010042704 | 4/2010 |
| WO | 2010103260 | 9/2010 |
| WO | 2011127535 | 10/2011 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2023287276 | 1/2023 |
| WO | 2023038579 | 3/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
IntelliView, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Lloyd's Register, Using technology to trace the carbon intensity of sustainable marine fuels, Feb. 15, 2023.
Borin Manufacturing, Inc., Dart for Test Station, Above Ground Remote Monitoring, Feb. 11, 2021.
Borin Manufacturing, Inc., Commanche Remote Monitoring and Control System, Mar. 24, 2017.
Borin Manufacturing, Inc., Dart for Rectifiers, Remote Monitoring and Control System. Nov. 1, 2017.
Borin Manufacturing, Inc., Stelth 2 Solid-State Reference Electrode for Buried and Concrete Service, Aug. 7, 2015.
Borin Manufacturing, Inc., Stelth 3, Nov. 10, 2016.
Borin Manufacturing, Inc., Stelth Reference Electrodes, Feb. 4, 2016.
Borin Manufacturing, Inc., Stelth Solid-State Reference Electrodes, Nov. 8, 2016.
Borin Manufacturing, Inc., Stelth Reference Electrodes, Oct. 10, 2017.
Borin Manufacturing, Inc., 'Miracle half-cell', Palladium: Borin's new reference electrode chemistry, Aug. 13, 2014.
Borin Manufacturing, Inc., Street Dart, For Test Station, Ground Level Remote Monitoring, Mar. 2017.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
Skelton et al., Onboard Refueling Vapor Recovery Systems Analysis of Widespread Use, Nescaum, Boston MA, Aug. 20, 2007.
Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.

* cited by examiner

SYSTEMS AND METHODS TO DETERMINE DEPTH OF SOIL COVERAGE ALONG A RIGHT-OF-WAY

CROSS-REFERENCE TO RELATED APPLICATIONS

The present application claims priority to and the benefit of U.S. Provisional Application No. 63/540,822, filed Sep. 27, 2023, titled "SYSTEMS AND METHODS TO DETERMINE DEPTH OF SOIL COVERAGE ALONG A RIGHT-OF-WAY," U.S. Provisional Application No. 63/540,692, filed Sep. 27, 2023, titled "SYSTEMS AND METHODS TO DETERMINE VEGETATION ENCROACHMENT ALONG A RIGHT-OF-WAY," and U.S. Provisional Application No. 63/539,039, filed Sep. 18, 2023, titled "SYSTEMS AND METHODS TO DETERMINE DEPTH OF SOIL COVERAGE ALONG A RIGHT-OF-WAY," the disclosures of which are incorporated herein by reference in their entirety.

FIELD OF DISCLOSURE

The present disclosure relates to systems and methods for determining a current depth of soil coverage along a right of way. In particular, the present disclosure relates to systems and methods for determining depth of soil coverage of a pipeline (or, in other embodiments, other buried or underground features) along a right-of-way.

BACKGROUND

Pipeline is positioned throughout various environments worldwide to transport various fluids, such as hydrocarbons and/or renewable hydrocarbons, as well as water and/or other fluids, each in a liquid or gaseous state. For example, hundreds of thousands of miles of pipeline are positioned throughout the United States alone. A majority of such pipeline is buried or underground. Other buried or underground features are positioned worldwide as well, such as utility lines, sewage or septic lines or tanks, tunnels, and/or other various underground features.

Exposure of such pipeline or other underground features, caused by erosion, weather events, unintentional interference (for example, digging along a right-of-way), may result in damage to or risk of damage to the pipeline or other underground feature. To determine whether a pipeline is at risk of exposure, a person or technician may walk along the right of way and physically measure the distance from the surface to the top of the pipeline or other underground feature. However, such methods or techniques are expensive, time consuming, and prone to error (for example, mismeasurement, measurement in the wrong area, and/or lack of sufficient measurements).

Another typical method utilized involves flying over the right-of-way to determine whether a pipeline or other feature has actually been exposed. However, such methods simply detect actual exposures and do not predict whether there is a risk of exposure.

SUMMARY

Thus, in view of the foregoing, Applicant has recognized these problems and others in the art, and has recognized a need for enhanced systems and methods for determining a current depth of soil coverage along a right of way. Particularly, the present disclosure relates to systems and methods for determining depth of soil coverage of a pipeline (or, in other embodiments, other buried or underground features) along a right-of-way.

The disclosure herein provides embodiments of systems and methods for determining depth of soil coverage for a pipeline or other underground feature along a right-of-way or the entire right-of-way quickly (in relation to typical walking surveys or inline inspections), utilizing less resources, and/or before the pipeline and/or the other underground feature is actually exposed. Further, the systems and methods may determine the depth of soil coverage within centimeters or even less of a distance of actual depth of soil coverage.

Such systems and methods may include obtaining or receiving a depth of coverage measurement or survey. The depth of coverage survey may be obtained via a walking survey, original construction records, and/or via inline inspection. Such a survey may include a distance from the surface or top of the soil to a top of the feature (for example, a pipeline) along the right-of-way. In other words, the measurements may include measurements for varying points along the right-of-way or for the continuous length of the right-of-way.

Once the depth of coverage measurement is available, the systems and methods may capture or prompt capture of baseline images of the right-of-way. The baseline images may include a plurality of images captured at various angles, for example, top-down images, horizontal images, and/or images at various angles. Further, the baseline images may be captured by one or more vehicles. The one or more vehicles may include a transportation vehicle (for example, a car or truck), an all-terrain vehicle, and/or an aerial vehicle, each of the vehicles being manned or unmanned (for example, a drone).

The system and methods may then utilize the baseline images to render a three dimensional elevation model of the right-of-way. Such a rendering may include utilization of photogrammetry and/or other models to generate such a three dimensional model. The three dimensional elevation model may include various surface features and/or heights along the path of the right-of-way. The systems and methods may georeference the three dimensional elevation model. In other words, coordinates may be assigned to the three dimensional model, enabling the systems and methods to correlate actual areas of the right-of-way with other values in other models and/or measurements (for example, an updated three dimensional model and/or depth of coverage measurement). The georeferenced three dimensional elevation model may include spatial references. The systems and method may utilize mathematical formula and/or known coordinates, spatial references, and/or other models to perform such georeferencing.

The systems and methods may then add the depth of coverage measurements to the georeferenced three dimensional model. The systems and methods may utilize coordinates included in the depth of cover measurements to add the depth of coverage to the correct location in the georeferenced three dimensional elevation model. In an embodiment, the systems and methods may include numbers associated with the depth of coverage in the three dimensional elevation model, allowing users to view current depth of coverage. Further, the systems and methods may relate the current depth of coverage with the current elevation, thus, as the elevation changes (as determined by subsequently captured images), the subsequent depth of coverage may be determined.

The systems and methods, as noted, may capture additional and/or subsequent images. The time that the subsequent images may be captured may be dependent on the location of the right-of-way, among other factors. The systems and methods may render an updated three dimensional elevation model based on these subsequent images. The systems and methods may utilize the updated three dimensional elevation model and the previously determined three dimensional elevation model to determine a delta depth of coverage. The systems and methods may determine whether this delta depth of coverage has exceeded a threshold (dependent, for example, on location and/or type of feature or pipeline) and, if the delta depth of coverage has exceeded the threshold, generate an alert and/or recommended remedial action.

Thus, as noted, the depth of coverage may be determined before a feature or pipeline is actually exposed. Further, the depth of coverage may be determined in a shorter than typical amount of time and/or utilizing less resources.

Accordingly, an embodiment of the disclosure is directed to a method to determine depth of soil coverage for a pipeline along a pipeline right-of-way. The method may include receiving a right-of-way walking survey for the pipeline right-of-way. The right-of-way walking survey may include a depth of soil coverage over the pipeline for the pipeline right-of-way. The method may include capturing baseline images of the pipeline right-of-way within a first selected time of the right-of-way walking survey. The method may include rendering a three dimensional elevation model of the pipeline right-of-way from the baseline images. The method may include georeferencing the three dimensional elevation model to generate a georeferenced three dimensional elevation model. The method may include adding or superimposing the soil coverage to the georeferenced three dimensional elevation model. The method may include capturing subsequent images of the pipeline right-of-way after a second selected time. The method may include rendering an updated three dimensional elevation model of the pipeline right-of-way from the subsequent images. The method may include determining a delta depth of soil coverage of the pipeline based on the georeferenced three dimensional elevation model and the updated three dimensional elevation model.

In an embodiment, the right-of-way walking survey may comprise a survey grade quality and includes one or more of latitude, longitude, elevation, depth of soil coverage from a top of the pipeline to a surface of the pipeline right-of-way, XY coordinates, Z coordinates, or a measurement process. In another embodiment, the delta depth of soil coverage may comprise an actual depth of soil coverage within about 3 centimeters.

In an embodiment, the method may include determining whether the delta depth of soil coverage exceeds a selected threshold and, in response to a determination that the delta depth of soil coverage exceeds the selected threshold, generating an alert. The selected threshold may comprise a variable length based on a location of the pipeline and an environment surrounding of the pipeline. The alert may include one or more of the delta depth of soil coverage, a previous depth of soil coverage, the selected threshold, a location of the pipeline right-of-way where the delta depth of soil coverage, a severity level, or a next action, and the next action may include one or more of adjustment of a current depth of soil coverage, adjustment of pipeline depth, or installation of pipeline protection.

In another embodiment, the method may include updating the georeferenced three dimensional elevation model with the updated three dimensional model. An updated georeferenced three dimensional elevation model may include one or more of symbols or colors indicating a change in the depth of soil coverage and a severity of the change.

In an embodiment, the second selected time may comprise a time based on a location of the pipeline and an environment surrounding of the pipeline. The second selected time may comprise a time less than a year, about 1 year, about 2 years, about 3 years, about 5 years, about 8 years, about 10 years, or about 10 years. The capture of second subsequent images may occur based on the second selected time and the delta depth of soil coverage.

The method may further include verifying the delta depth of soil coverage at a portion of the pipeline right of way via a second right-of-way walking survey.

In an embodiment, the baseline images and/or the subsequent images are high resolution aerial images may be captured by an image sensor on an unmanned and/or manned aerial vehicle.

Another embodiment of the disclosure is directed to a method to determine depth of soil coverage for an underground feature along a right-of-way. The method may include capturing images of the right-of-way after a selected time. The method may include rendering an updated three dimensional elevation model of the right-of-way from the subsequent images. The method may include determining a delta depth of soil coverage of the underground feature based on the georeferenced three dimensional elevation model and the updated three dimensional elevation model. The method may include superimposing a depth of soil coverage and the delta depth of soil coverage on the updated three dimensional elevation model. In an embodiment, the underground feature may comprise a pipeline, a utility line, or a septic system. In a further embodiment, if the underground feature comprises a pipeline, then the pipeline may transport a hydrocarbon fluid.

In another embodiment, the method may include receiving a depth of cover measurement from ground level for the right-of-way. The depth of cover measurement may be received from one or more of a walking survey, original construction records, or via inline inspection The method may include capturing baseline images of the right-of-way within a prior selected time of reception of the depth of cover measurement. The method may include rendering a three dimensional elevation model of the right-of-way from the baseline images. The method may include georeferencing the three dimensional elevation model to generate the georeferenced three dimensional elevation model. The method may include superimposing the soil coverage to the georeferenced three dimensional elevation model.

In another embodiment, the method may include, in response to the delta depth of soil coverage being outside of a threshold range, generating an alert to include an indication of an area with a depth of soil coverage below a selected limit. The selected limit may be based on a type of the underground feature. The alert may be superimposed onto the updated three dimensional model. The alert may include a remedial action, and the remedial action may include one or more of adding surface coverage over the underground feature or lowering the underground feature further below ground.

Another embodiment of the disclosure is directed to a system for determining depth of soil coverage for a pipeline along a pipeline right-of-way. The system may include a survey and image capture circuitry. The survey and image capture circuitry may be configured to receive at an initial selected time (a) a right-of-way walking survey and (b)

baseline captured images of the pipeline right-of-way and receive subsequent images at one or more subsequent selected times of the pipeline right-of-way. The system may include a baseline modeling circuitry. The baseline modeling circuitry may be configured to determine a baseline depth of soil coverage model for the pipeline along a pipeline right-of-way based on (a) the right-of-way walking survey and (b) the baseline captured images of the pipeline right-of-way. The system may include a depth of coverage modeling circuitry. The depth of coverage modeling circuitry may be configured to, in response to reception of subsequent images, determine an updated surface level of the pipeline right-of-way and update the baseline depth of soil coverage model based on the updated surface level to generate a subsequent depth of soil coverage model.

In an embodiment, the depth of coverage modeling circuitry may be further configured to, if the subsequent depth of soil coverage model is available, update the subsequent depth of soil coverage model.

In an embodiment, the baseline depth of soil coverage model and the subsequent depth of soil coverage model may each comprise a three dimensional elevation model indicating a distance from a top of the pipeline along the pipeline right-of-way to a surface level. The distance may comprise a length within about 3 centimeters of an actual distance from the top of the pipeline in the pipeline right-of-way to the surface level.

In another embodiment, the system may include one or more controllers. The one or more controllers may include the survey and image capture circuitry and/or the depth of coverage modeling circuitry.

Another embodiment of the disclosure is directed to a computing device for determining depth of soil coverage for a pipeline along a pipeline right-of-way, the computing device comprising a processor and a non-transitory computer-readable storage medium storing software instructions that, when executed by the processor, in response to reception of (a) a right-of-way walking survey for the pipeline right-of-way including a depth of soil coverage over the pipeline for the pipeline right-of-way and (b) captured baseline images of the pipeline right-of-way within a first selected time of the right-of-way walking survey, may render a three dimensional elevation model of the pipeline right-of-way from the baseline images. The software instructions, when executed by the processor, may georeference the three dimensional elevation model to generate a georeferenced three dimensional elevation model. The software instructions, when executed by the processor, may superimpose or add the soil coverage to the georeferenced three dimensional elevation model. The software instructions, when executed by the processor, may capture subsequent images of the pipeline right-of-way after a second selected time. The software instructions, when executed by the processor, may render an updated three dimensional elevation model of the pipeline right-of-way from the subsequent images. The software instructions, when executed by the processor, may determine a delta depth of soil coverage of the pipeline based on the georeferenced three dimensional elevation model and the updated three dimensional elevation model.

In another embodiment, the software instructions, when executed by the processor, may integrate the delta depth of soil coverage of the pipeline into the updated three dimensional elevation model. The software instructions, when executed by the processor, may determine an indicator for each section of the updated three dimensional elevation model based on the delta depth of soil coverage and a selected threshold for each section. The selected threshold may comprise a value based on one or more of a location of the pipeline right-of-way or an environment of the pipeline right-of-way.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the disclosure's scope.

DETAILED DESCRIPTION

Figure 1A:
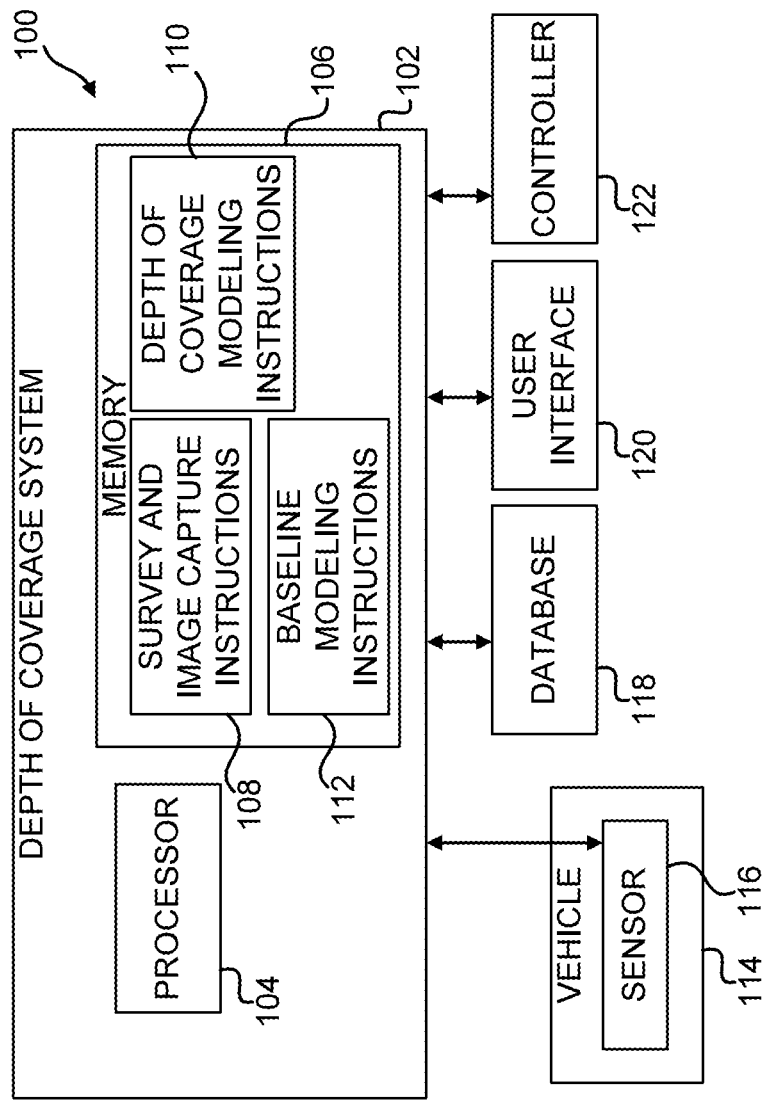
FIG. 1A is a simplified diagram that illustrates a system for determining a depth of coverage for a right-of-way, according to an embodiment of the disclosure.

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. However, it is to be noted that the drawings illustrate only various embodiments of the systems and methods disclosed herein and are therefore not to be considered limiting of the scope of the systems and methods disclosed herein as it may include other effective embodiments as well.

Typically, to determine depth of coverage (in other words, the distance from the surface to the top of a buried feature) along a right-of-way, a walking survey, an inline inspection, and/or or construction records may be utilized. Each technique or method may utilize large amounts of time and/or resources. For example, for a walking survey, a user or technician may walk varying lengths of the right-of-way physically measuring depth of cover. Finally, capturing images over a right-of-way may not accurately predict potential pipeline exposure and, typically, simply captures currently exposed pipeline.

Thus, in view of the foregoing, Applicant has recognized these problems and others in the art, and has recognized a need for enhanced systems and methods for determining a current depth of soil coverage along a right of way. Such systems and methods may include obtaining or receiving a depth of coverage measurement or survey. The depth of coverage survey may be obtained via a walking survey, original construction records, and/or via inline inspection. Such a walking survey may include a distance from the surface or ground surface or top of the soil or other material to a top of the feature (for example, a pipeline) along the right-of-way. In other words, the measurements may include measurements for varying points along the right-of-way or for the continuous length of the right-of-way that show the amount or depth of coverage of the underground feature.

Once the depth of coverage measurement is available, the systems and methods may capture or prompt capture of baseline images of the right-of-way. The baseline images may include a plurality of images captured at various angles, for example, top-down images, horizontal images, and/or images at various angles. Further, the baseline images may be captured by one or more vehicles. The one or more vehicles may include a transportation vehicle (for example, a car or truck), an all-terrain vehicle, and/or an aerial vehicle, each of the vehicles being manned or unmanned (for example, a drone). Such systems and methods may capture the baseline images within a selected time of reception of the depth of coverage measurement. For example, the baseline images may be captured within about 1 week, about 2 weeks, about 30 days, or about 2 months of the depth of coverage measurement. Such a time frame may ensure that an accurate, current depth of coverage is correlated to a current three dimensional elevation model.

The system and methods may then utilize the baseline images to render a three dimensional elevation model of the right-of-way. Such a rendering may include utilization of photogrammetry and/or other models to generate the three dimensional model featuring varying heights and geographic features and/or elements. The three dimensional elevation model may include various surface features and/or heights along the path of the right-of-way. The systems and methods may georeferenced the three dimensional elevation model. In other words, coordinates may be assigned to the three dimensional model, enabling the systems and methods to correlate actual areas of the right-of-way with other values in other models and/or measurements (for example, an updated three dimensional model and/or depth of coverage measurement). The georeferenced three dimensional elevation model may include spatial references. The systems and method may utilize mathematical formula and/or known coordinates, spatial references, and/or other models to perform such georeferencing.

The systems and methods may then superimpose or add the depth of coverage measurements to the georeferenced three dimensional model. The systems and methods may utilize coordinates included in the depth of cover measurements to superimpose or add the depth of coverage to the correct location or correlated location in the georeferenced three dimensional elevation model. In an embodiment, the systems and methods may include the actual numbers in the three dimensional elevation model, allowing users to view current depth of coverage measurements in relation to the surface. Further, as noted, the systems and methods may relate or correlate the current depth of coverage with the current elevation, thus, as the elevation changes (as determined based upon subsequently captured images), the subsequent depth of coverage may be determined.

The systems and methods, as noted, may capture additional and/or subsequent images. The time that the subsequent images may be captured may be dependent on the location of the right-of-way, among other factors. For example, rights-of-way in an arid environment with few inhabitants or near agricultural land, geographic changes to the surface may be unexpected, thus, monitoring may occur yearly or at a frequency including multiple years. On the other hand, right-of ways including numerous inhabitants (for example, near a city or town), near a river or other water way, and/or near other areas prone to potential changes to the surface may be monitored frequently, for example, weekly, monthly, and/or a plurality of times within a year. The systems and methods may render an updated three dimensional elevation model based on these subsequent images. The systems and methods may utilize the updated three dimensional elevation model and the previously determined three dimensional elevation model to determine a delta depth of coverage. The systems and methods may determine whether this delta depth of coverage has exceeded a threshold (dependent, for example, on location and/or type of feature or pipeline) and, if the threshold has been exceeded, generate an alert and/or recommended next or remedial action. Such a next or remedial action may include adding or adjusting surface coverage (such as dirt or other materials) and/or lowering the pipeline further below grade or ground, among other actions.

Thus, as noted, the depth of coverage may be determined before an underground feature or pipeline is actually exposed. Further, the depth of coverage may be determined in a shorter than typical amount of time and/or utilizing less resources.

FIG. 1A is a simplified diagram that illustrates a system or a depth of coverage system 102 for determining a depth of coverage for a right-of-way, according to an embodiment of the disclosure. The depth of coverage system 102 may include a processor 104 and memory 106. The memory 106 may store instructions, such as survey and image capture instructions 108, baseline modeling instructions 112, and/or depth of coverage modeling instructions 110. The depth of coverage system 102 may connect to a vehicle 114 or a sensor 116 (such as an image sensor) of the vehicle 114. In an embodiment, the depth of coverage system 102 may be in signal communication with the vehicle 114 or sensor 116. In such embodiments, the depth of coverage system 102 may receive images (for example, baseline or subsequent images) as they are captured by the vehicle 114 or sensor 116. In another embodiment, the depth of coverage system 102 may receive captured images after the images are captured and after the vehicle 114 has returned to a selected location. In yet another embodiment, the depth of coverage system 102 may connect to a database 118. In such an embodiment, the captured images may be transferred to the database 118 from the vehicle 114 and the depth of coverage system 102 may obtain images from the database 118. Further, the depth of coverage system 102 may connect to a user interface 120 and/or a controller 122. The depth of coverage system 102 may request and/or receive images and/or depth of coverage measurements from the user interface 120 and/or controller 122 (and/or other sources in other embodiments). Further, the depth of coverage system 102 may generate alerts and transmit such alerts to a user via the user interface 120 and/or the controller 122.

As noted, the memory 106 may include instructions. The instructions may include survey and image capture instructions 108. When the survey and image capture instructions 108 are executed by the processor, the survey and image capture instructions 108 may initially cause the depth of coverage system 102 to request and/or initiate depth of coverage measurements for a selected right-of-way or section or portion of the selected right-of-way. Such a depth of coverage measurement may be obtained via a walking survey (for example, via a technician or user), via inline inspection (for example, a device may pass through a pipeline and measure depth of coverage and, further, initiation of the device may be automatically initiated via the depth of coverage system 102), and/or via original construction records (for example, as stored in the database 118). In an embodiment, the inline inspection tool may comprise a smart pig configured to capture latitude, longitude, and elevation measurements as the smart pig progresses through a pipeline. In an embodiment, the walking survey, the inline inspection, and/or the original construction records may include one or more of latitude, longitude, elevation, depth of soil coverage from a top of the pipeline to a surface of the pipeline right-of-way, XY coordinates, Z coordinates, or a measurement process.

In another embodiment, the pipeline may transport hydrocarbon fluids and/or renewable fluids. "Hydrocarbon fluids" as used herein, may refer to petroleum fluids, renewable fluids, and other hydrocarbon based fluids. "Renewable fluids" as used herein, may refer to fluids containing and/or based on plant and/or animal derived feedstock. Further, the renewable fluids may be hydrocarbon based. For example, a renewable fluid may be a pyrolysis oil, oleaginous feedstock, biomass derived feedstock, or other fluids, as will be understood by those skilled in the art.

In another embodiment, the memory 106 may include baseline modeling instructions 112. The baseline modeling instructions 112 may, when executed by the processor 104, cause the depth of coverage system 102 to initiate and/or receive baseline images. For example, when the baseline modeling instructions 112 are executed, the depth of coverage system 102 may send a signal to the vehicle 114 to capture baseline images. The vehicle 114 may, in an embodiment, comprise a transportation vehicle (such as a car or truck), an all-terrain vehicle, an unmanned aerial vehicle (such as a drone), and/or a manned aerial vehicle (such as an airplane). In a further embodiment, the depth of coverage system 102 may initiate or cause an unmanned aerial vehicle to automatically traverse a selected right-of-way and capture baseline images of the selected right-of-way.

Once the baseline images have been captured and received by the depth of coverage system 102, the baseline modeling instructions 112 may cause the depth of coverage system 102 to render a three dimensional elevation model of the right-of-way. As noted, the baseline images may include top-down images, angled top-down images, horizontal images, and/or images from other directions. All of the baseline images may be utilized to generate a three dimensional elevation model, for example, via a photogrammetry algorithm and/or other models. Such a three dimensional elevation model may include the surface of the right-of-way, including various heights and/or features of the surface or ground level of the right-of-way. In an embodiment, the three dimensional baseline model may include ground control points. The ground control points may be determined based on metadata included in the capture images. Further, the ground control points may include known points including visible objects (for example, an aerial marker, waterway crossing, edge of road crossings, an encumbrance, and/or above grade features or pipeline features). The ground control point may provide a highly accurate benchmark measurement to improve the overall accuracy of surrounding elevation data.

Once the baseline three dimensional elevation model has been generated, the baseline modeling instructions 112 may cause the depth of coverage system 102 to georeference the three dimensional elevation model. In other words, the depth of coverage system 102 may bind or assign the points in the three dimensional elevation model to a spatial reference via one or more mathematical formula and/or known ground and/or location points. In an embodiment, georeferencing may occur prior to or in parallel with generation of the baseline three dimensional elevation model. Finally, the baseline modeling instructions 112 may cause the depth of coverage system 102 to superimpose or add the depth of coverage measurements to the georeferenced three dimensional elevation model, based on the georeferencing. In an embodiment, the depth of coverage measurement may be georeferenced prior to addition to the georeferenced three dimensional elevation model, allowing the depth of coverage system 102 to include the depth of coverage measurements in an accurate portion of the three dimensional elevation model.

In another embodiment, the memory 106 may include depth of coverage modeling instructions 110. The depth of coverage modeling instructions 110 may, once a baseline model (for example, the georeferenced three dimensional elevation model with depth of coverage measurements) has been established and when executed by the processor 104, cause the depth of coverage system 102 to initiate or request subsequent images. The vehicle 114 or sensor 116 may capture the subsequent images similar to the capture of the baseline images. In an embodiment, the subsequent images may be captured after a second selected time. The second selected time may be based upon the environment of the right-of-way (for example, environments prone to change may be monitored at shorter intervals than that of environments that do not change as often). In an embodiment, the second selected time may include less than a year, about 1 year, about 2 years, about 3 years, about 5 years, about 8 years, about 10 years, or even longer in some examples (such an amount of time dependent on the environment of the right-of-way).

Once the subsequent images have been captured and received by the depth of coverage system 102, the depth of coverage modeling instructions 110 may be executed to cause the depth of coverage system 102 to generate or render an updated three dimensional elevation model. Further, the depth of coverage system 102 may georeference the updated three dimensional elevation model. Finally, the depth of coverage modeling instructions 110 may cause the depth of coverage system 102 to determine a delta depth of coverage. The depth of coverage system 102 may compare the updated three dimensional elevation model with the previous three dimensional elevation model to determine such a delta depth of coverage. In an embodiment, to verify that the delta depth of coverage is accurate, after a determination of the delta depth of coverage, the depth of coverage system 102 may prompt and/or initiate a walking survey or inline inspection.

In another embodiment, the depth of coverage modeling instructions 110, when executed, may cause the depth of coverage system 102 to determine whether the delta depth of coverage exceeds a selected threshold. The selected threshold may vary depending on the environment of the right of way. For example, the selected threshold for an area where depth of coverage is not expected to change frequently and/or significantly may be relatively small, such as on the order of centimeters, whereas the selected threshold for an area where depth of coverage may change significantly over time may be relatively larger, such as on the order of meters. If the delta depth of coverage exceeds the selected threshold, then the depth of coverage system 102 may generate an alert. The alert may indicate and/or include the delta depth of coverage, the location of the right-of-way where the alert occurred (for example, including, in an embodiment, the coordinates), and/or a next action or remedial action. In an embodiment, the next action or remedial action may include adding soil or other material over the top of the affected area and/or digging out the underground feature (such as a pipeline) and lowering the underground feature further below ground.

In another embodiment, the depth of coverage system 102 may include and/or generate an another updated three dimensional elevation model based on an alert or the another updated three dimensional elevation model may be the alert or include the alert therein. For example, if an issue is detected or if a portion of the right-of-way includes a delta depth of coverage that exceeds the selected threshold, then that portion of the right-of-way may be highlighted. Further, additional information may be added to such a portion of the right-of-way, in the another updated three dimensional elevation model, such as, for example, location data, actual depth of coverage (for example, within about 1 centimeter or within about 3 centimeters to about 10 centimeters), severity (for example, high, medium or low), and/or other relevant data.

As noted, the depth of coverage system 102 may connect to a controller 122 or a plurality of controllers. In such embodiments, the controller 122 may be utilized to monitor the right-of-way. The controller 122 may control various vehicles and/or other components associated with underground features (such as a pipeline).

In some examples, the depth of coverage system 102 may be a computing device. The term "computing device" is used herein to refer to any one or all of programmable logic controllers (PLCs), programmable automation controllers (PACs), industrial computers, servers, virtual computing device or environment, desktop computers, personal data assistants (PDAs), laptop computers, tablet computers, smart books, palm-top computers, personal computers, smartphones, virtual computing devices, cloud based computing devices, and similar electronic devices equipped with at least a processor and any other physical components necessarily to perform the various operations described herein. Devices such as smartphones, laptop computers, and tablet computers are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

As used herein, a "non-transitory machine-readable storage medium" or "memory" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

As used herein, a "processor" or "processing circuitry" may include, for example one processor or multiple processors included in a single device or distributed across multiple computing devices. The processor (such as, processor 104 shown in FIG. 1A or processing circuitry 202 shown in FIG. 2) may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

Figure 1B:
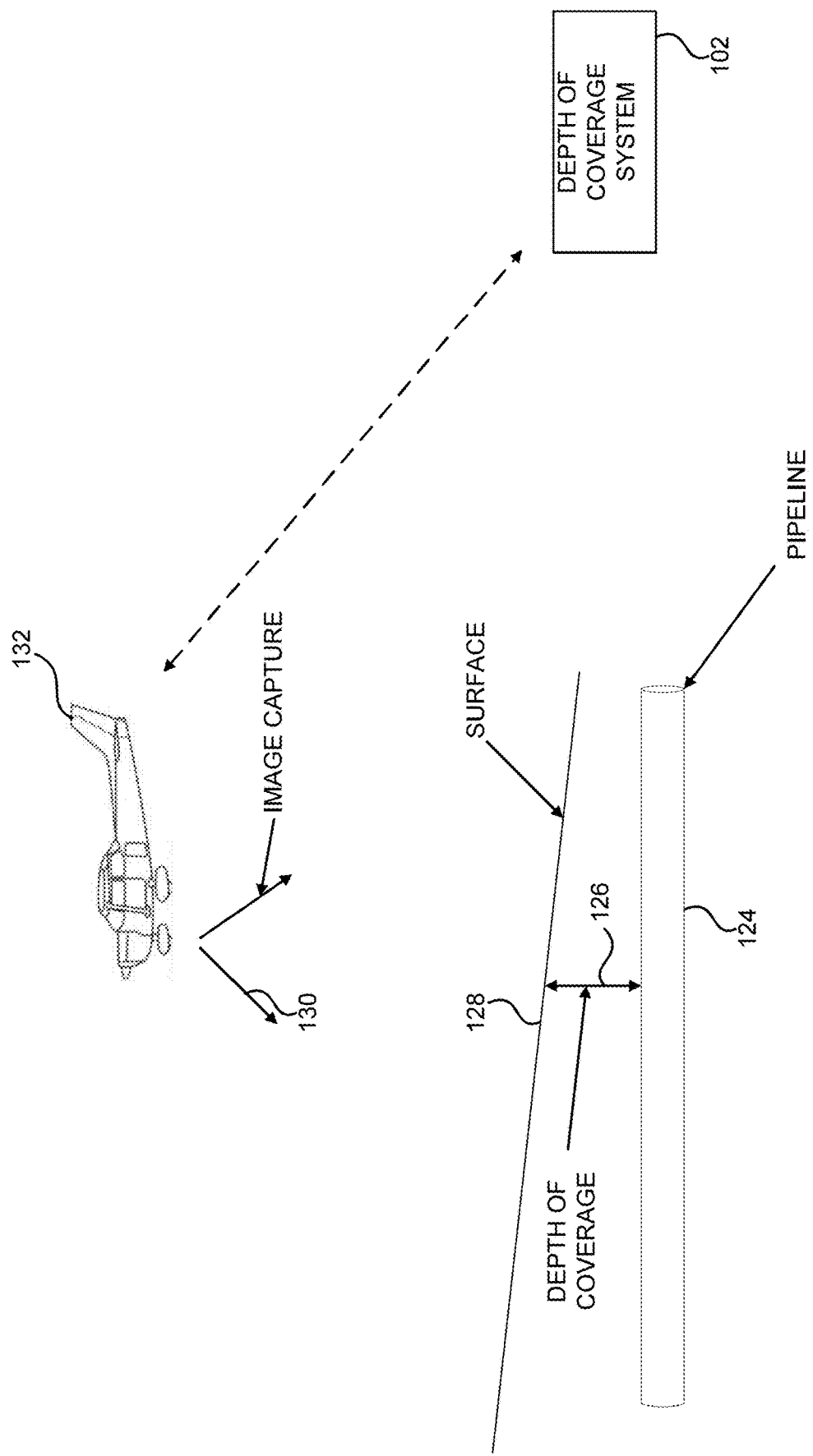
FIG. 1B, FIG. 1C, and FIG. 1D are simplified schematic diagrams that illustrate a system for determining a depth of coverage for a right-of-way and a vehicle for capturing images of the right-of-way, according to an embodiment of the disclosure.
Figure 1C:
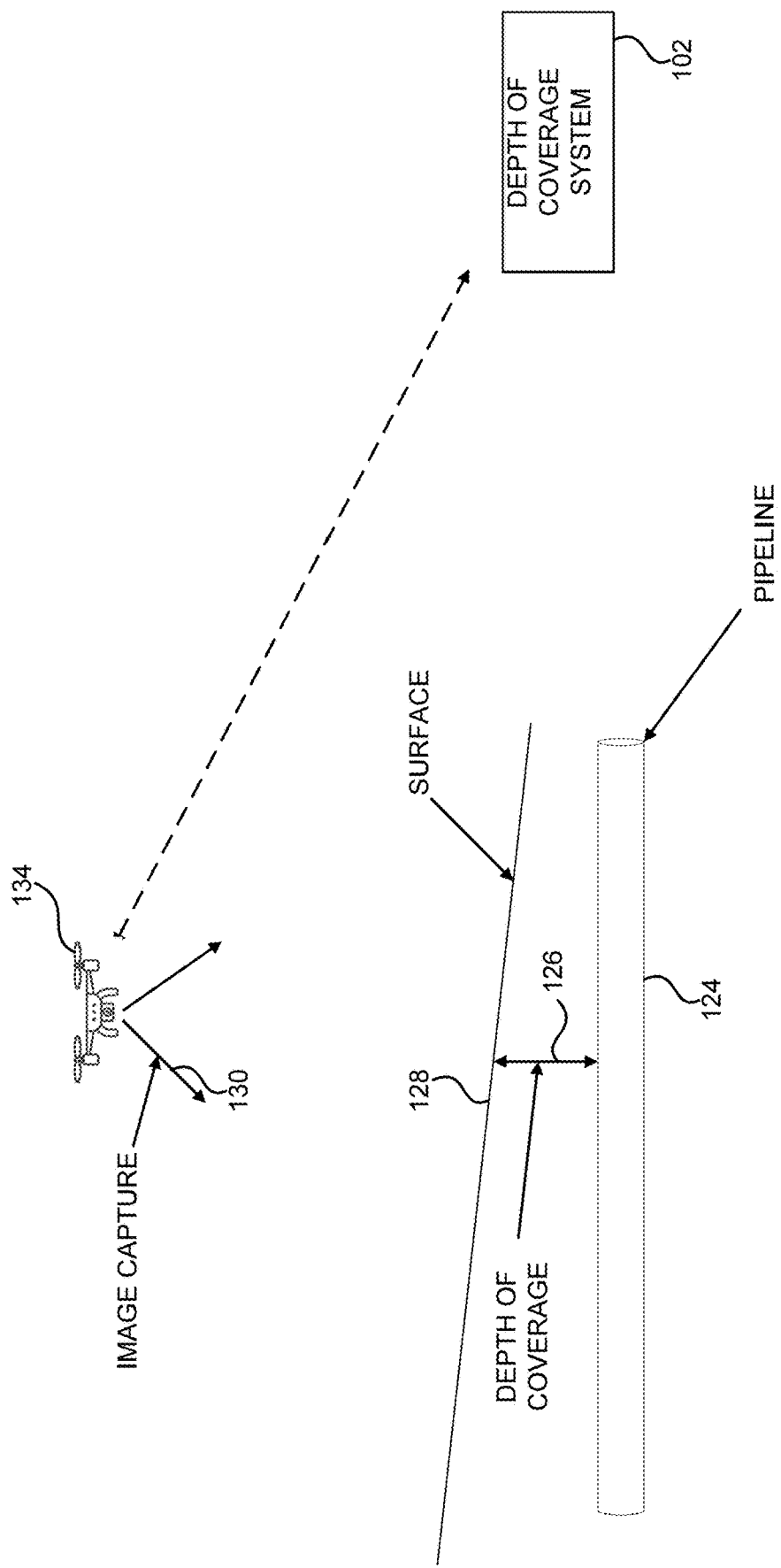
Figure 1D:
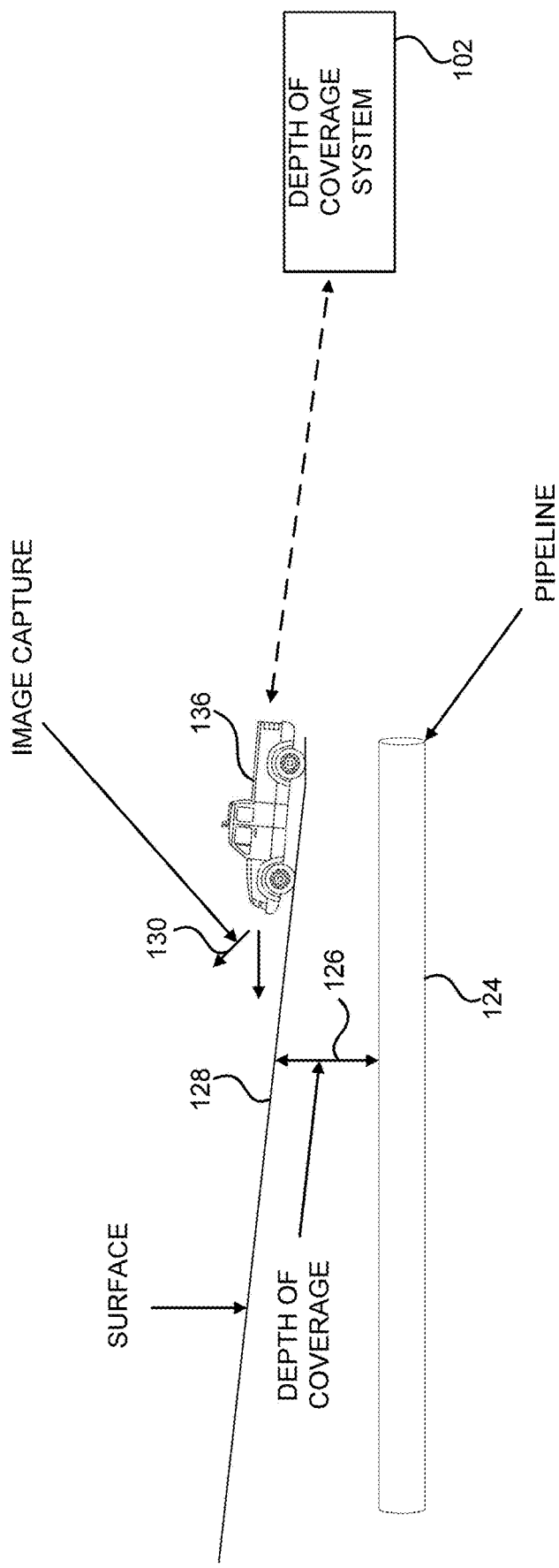

FIG. 1B, FIG. 1C, and FIG. 1D are simplified schematic diagrams that illustrate a system for determining a depth of coverage for a right-of-way and a vehicle for capturing images of the right-of-way, according to an embodiment of the disclosure. Turning first to FIG. 1B, the underground feature comprises a pipeline 124 buried underground or positioned beneath the surface 128. While a pipeline 124 is illustrated, as a non-limiting embodiment, as the underground feature, it will be understood that other underground features may be positioned underground along a right-of-way. The depth of coverage 126 may refer to the amount of material or soil covering the pipeline 124 at a particular point. While the surface 128 is illustrated as a slope, it will be understood that the surface may comprise a flat or relatively uniform surface, an uneven surface, a surface including various objects (for examples, trees, other foliage, buildings, water-ways, and/or other objects), and/or combinations thereof along the entirety of a right-of-way.

The vehicle, in such embodiments, may comprise a manned aerial vehicle 132, such as an airplane. The manned aerial vehicle 132 may include an image sensor (for example, a camera, a series of image sensors, a normal camera, a wide-angle camera, an ultra-wide angle camera, an infrared camera, a video camera, a camera configured to take a plurality of images consecutively and at high speed, and/or a camera configured to capture multi-spectral images, among other types of cameras) configured to capture images (as illustrated by 130 in FIG. 1B). The manned aerial vehicle 132 may fly along a portion of or the entirety of the right-of-way, capturing images along the route. The manned aerial vehicle 132 may connect to the depth of coverage system 102. In an embodiment, as the manned aerial vehicle 132 captures images, the manned aerial vehicle may transmit those images to the depth of coverage system 102 in real time. In another embodiment, the manned aerial vehicle 132 may capture the images and, once the flight along the right-of-way is complete, return to a location. At the location, the manned aerial vehicle 132 may connect to the depth of coverage system 102, a database, and/or another computing device. The manned aerial vehicle 132 may then proceed to transmit the images to the depth of coverage system 102, a database, and/or another computing device. In embodiments, the depth of coverage system 102 may connect to the database and/or the another computing device and, if the manned aerial vehicle 132 transmit images to the database and/or the another computing device, receive and/or scan for images collected and stored in the database and/or the another computing device.

Turning to FIGS. 1C and 1D, other vehicles may be used to capture images, rather than or in addition to the manned aerial vehicle 132. For example, an unmanned aerial vehicle 134 (such as a drone) and/or a transportation vehicle 136 (such as a truck or all-terrain vehicle) may be utilized to capture images. Other vehicles may be utilized, as well as satellite based imagery.

In an embodiment, each captured image may include a time stamp and/or location data. If multiple vehicles and/or other image sources (for example, satellites) are used to capture images, then the depth of coverage system 102 may utilized the location data for georeferencing and/or the time stamp to determine the latest delta depth of coverage.

Figure 2:
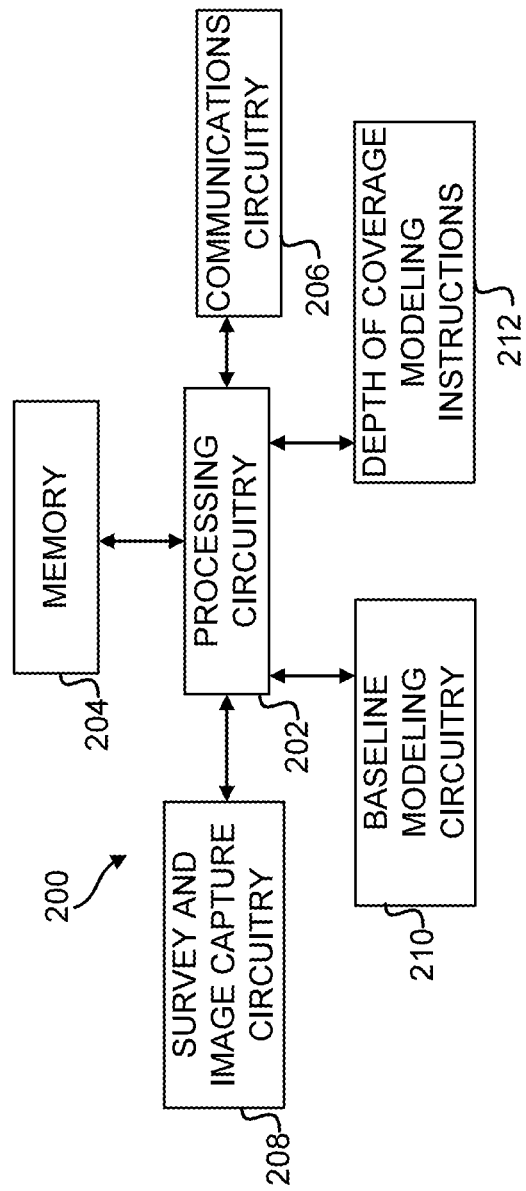
FIG. 2 is a simplified diagram that illustrates an apparatus for determining a depth of coverage for a right-of-way, according to an embodiment of the disclosure.

FIG. 2 is a simplified diagram that illustrates an apparatus 200 for determining a depth of coverage for a right-of-way, according to an embodiment of the disclosure. Such an apparatus 200 may be comprised of a processing circuitry 202, a memory 204, a communications circuitry 206, a survey and image capture circuitry 208, a baseline modeling circuitry 210, and a depth of coverage modeling circuitry 212, each of which will be described in greater detail below. While the various components are illustrated in FIG. 2 as being connected with processing circuitry 202, it will be understood that the apparatus 200 may further comprise a bus (not expressly shown in FIG. 2) for passing information amongst any combination of the various components of the apparatus 200. The apparatus 200 may be configured to execute various operations described herein, such as those described above in connection with FIGS. 1A-1D and below in connection with FIGS. 3-4.

The processing circuitry 202 (and/or co-processor or any other processor assisting or otherwise associated with the processor) may be in communication with the memory 204 via a bus for passing information amongst components of the apparatus. The processing circuitry 202 may be embodied in a number of different ways and may, for example, include one or more processing devices configured to perform independently. Furthermore, the processor may include one or more processors configured in tandem via a bus to enable independent execution of software instructions, pipelining, and/or multithreading.

The processing circuitry 202 may be configured to execute software instructions stored in the memory 204 or otherwise accessible to the processing circuitry 202 (e.g., software instructions stored on a separate storage device). In some cases, the processing circuitry 202 may be configured to execute hard-coded functionality. As such, whether configured by hardware or software methods, or by a combination of hardware with software, the processing circuitry 202 represents an entity (for example, physically embodied in circuitry) capable of performing operations according to various embodiments of the present disclosure while configured accordingly. Alternatively, as another example, when the processing circuitry 202 is embodied as an executor of software instructions, the software instructions may specifically configure the processing circuitry 202 to perform the algorithms and/or operations described herein when the software instructions are executed.

Memory 204 is non-transitory and may include, for example, one or more volatile and/or non-volatile memories. In other words, for example, the memory 204 may be an electronic storage device (for example, a computer readable storage medium). The memory 204 may be configured to store information, data, content, applications, software instructions, or the like, for enabling the apparatus 200 to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network. The communications circuitry 206, in an embodiment, may enable reception of depth of coverage measurements, baseline images, and/or subsequent images and may enable transmission of three dimensional elevation models and/or alerts.

The apparatus 200 may include survey and image capture circuitry 208 configured to initiate a survey or depth of coverage measurement operation, receive the survey or depth of coverage measurements, and/or initiate capture of baseline images and/or other images. Initiation of a survey or depth of coverage measurement operation may include prompting a user or technician to begin such a survey, automatically prompting an inline inspection apparatus or tool to begin such a survey, and/or obtaining from a database or the memory 204 construction records. Similarly, initiating capture of baseline and/or other images may include prompting a user or technician to being a fly over of a selected right-of-way and/or automatically initiating an unmanned vehicle (such as an unmanned aerial vehicle) to begin traversing (such as via flying over) a right-of-way. The survey and image capture circuitry 208 may utilize processing circuitry 202, memory 204, or any other hardware component included in the apparatus 200 to perform these operations, as described in connection with FIG. 4 below. The survey and image capture circuitry 208 may further utilize communications circuitry 206, as noted above, to gather data (such as a depth of cover measurement) from a variety of sources (for example, from a database, the memory 204, via a user interface, and/or from another source). The output of the survey and image capture circuitry 208 may be transmitted to other circuitry of the apparatus 200 (such as the baseline modeling circuitry 210).

In addition, the apparatus 200 further comprises the baseline modeling circuitry 210 that may render a baseline three dimensional elevation model based on baseline images, georeferenced the three dimensional elevation model, and add the depth of coverage measurement to the georeferenced three dimensional model to form a baseline three dimensional elevation model. The baseline modeling circuitry 210 may also georeference the depth of coverage measurement. The baseline three dimensional elevation model may be subsequently utilized to determine whether a delta depth of coverage exceeds a selected threshold. The baseline modeling circuitry 210 may utilize processing circuitry 202, memory 204, or any other hardware component included in the apparatus 200 to perform these operations, as described in connection with FIG. 4 below. The baseline modeling circuitry 210 may further utilize communications circuitry 206 to gather data (for example, the depth of coverage measurement and/or baseline images or other types of images) from a variety of sources (such as the survey and image capture circuitry 208) and, in some embodiments, output the baseline three dimensional elevation model. In such examples, the output of the baseline modeling circuitry 210 may be utilized by and/or transmitted to the depth of coverage modeling circuitry 212.

The apparatus 200 further comprises the depth of coverage modeling circuitry 212 that may initiate or prompt capture of subsequent images of the right-of-way, render an updated three dimensional elevation model, determine a delta depth of coverage based on the baseline three dimensional elevation model and the updated three dimensional elevation model, determine whether the delta depth of coverage exceeds a selected threshold. The depth of coverage modeling circuitry 212 may utilize processing circuitry 202, memory 204, or any other hardware component included in the apparatus 200 to perform these operations, as described in connection with FIG. 4 below. The depth of coverage modeling circuitry 212 may further utilize communications circuitry 206 to transmit an alert to a user, controller, and/or computing device.

Although components 202-212 are described in part using functional language, it will be understood that the particular implementations necessarily include the use of particular hardware. It should also be understood that certain of these components 202-212 may include similar or common hardware. For example, the survey and image capture circuitry 208, the baseline modeling circuitry 210, and the depth of coverage modeling circuitry 212 may, in some embodiments, each at times utilize the processing circuitry 202, memory 204, or communications circuitry 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," with respect to elements of the apparatus therefore shall be interpreted as necessarily including the particular hardware configured to perform the functions associated with the particular element being described. Of course, while the terms "circuitry" should be understood broadly to include hardware, in some embodiments, the terms "circuitry" may in addition refer to software instructions that configure the hardware components of the apparatus 200 to perform the various functions described herein.

Although the survey and image capture circuitry 208, the baseline modeling circuitry 210, and the depth of coverage modeling circuitry 212 may leverage processing circuitry 202, memory 204, or communications circuitry 206 as described above, it will be understood that any of these elements of apparatus 200 may include one or more dedicated processors, specially configured field programmable gate arrays (FPGA), or application specific interface circuits (ASIC) to perform its corresponding functions, and may accordingly leverage processing circuitry 202 executing software stored in a memory or memory 204, communications circuitry 206 for enabling any functions not performed by special-purpose hardware elements. In all embodiments, however, it will be understood that the survey and image capture circuitry 208, the baseline modeling circuitry 210, and the depth of coverage modeling circuitry 212 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200 (or by a controller 302). Furthermore, some example embodiments (such as the embodiments described for FIGS. 1 and 3) may take the form of a computer program product comprising software instructions stored on at least one non-transitory computer-readable storage medium (such as memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Figure 3:
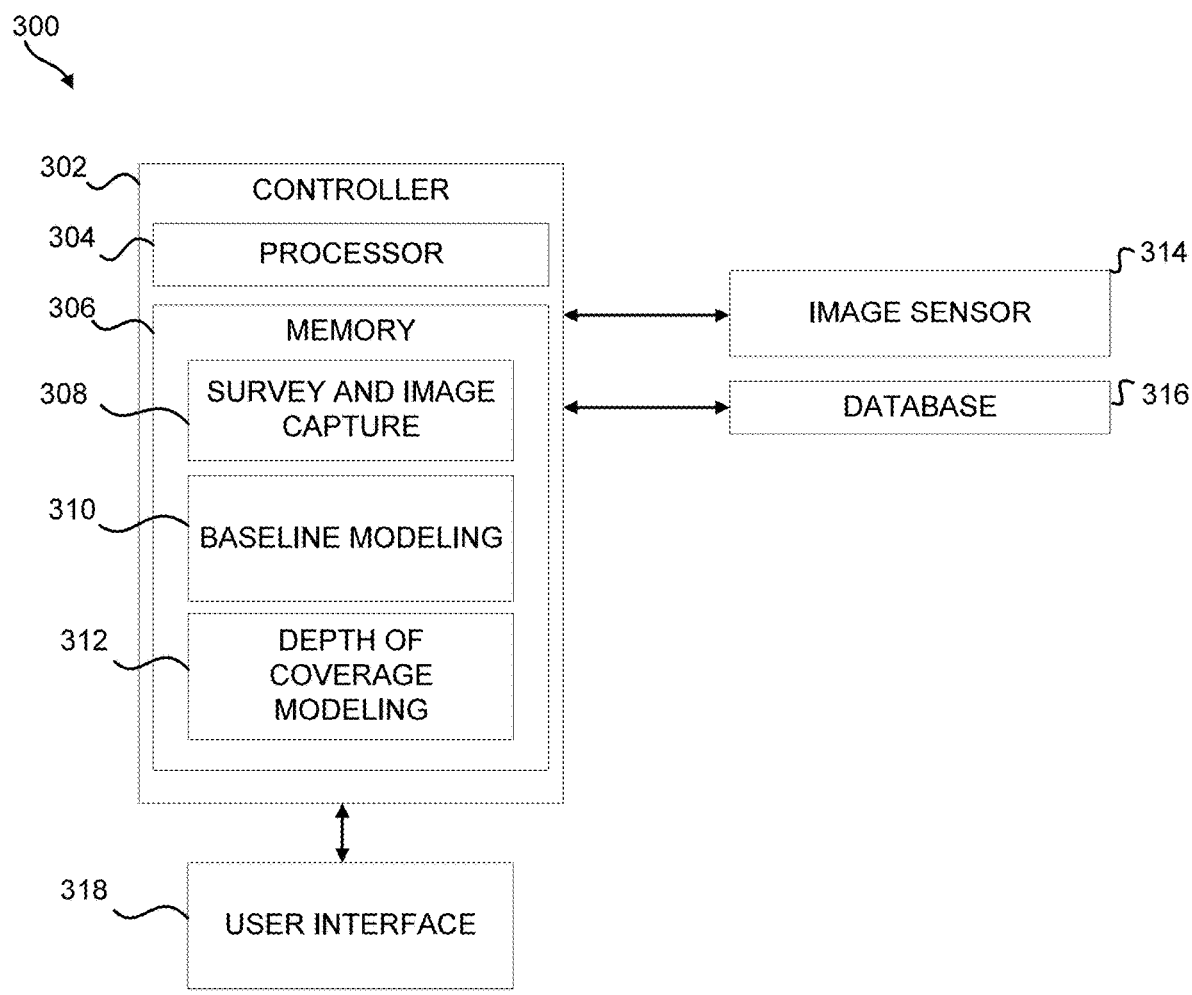
FIG. 3 is a simplified diagram that illustrates a control system for controlling determination of a depth of coverage for a right-of-way, according to an embodiment of the disclosure.

FIG. 3 is a simplified diagram that illustrates a control system for controlling determination of a depth of coverage for a right-of-way, according to an embodiment of the disclosure. As noted, system 300 or control system may include a controller 302. Further, controller 302 may connect to the an image sensor 314, a vehicle, a database 316, and/or other electronic devices positioned at various locations. The controller 302 may include memory 306 and one or more processors 304. The memory 306 may store instructions executable by one or more processors 304. In an example, the memory 306 may be a non-transitory machine-readable storage medium. As used herein, a "machine-readable storage medium" may be any electronic, magnetic, optical, or other physical storage apparatus or cyber-physical separation storage to contain or store information such as executable instructions, data, and the like. For example, any machine-readable storage medium described herein may be any of random access memory (RAM), volatile memory, non-volatile memory, flash memory, a storage drive (e.g., hard drive), a solid-state drive, any type of storage disc, and the like, or a combination thereof. As noted, the memory 306 may store or include instructions executable by the processor 304. As used herein, a "processor" may include, for example, one processor or multiple processors included in a single device or distributed across multiple computing devices. The processor 304 may be at least one of a central processing unit (CPU), a semiconductor-based microprocessor, a graphics processing unit (GPU), a field-programmable gate array (FPGA) to retrieve and execute instructions, a real-time processor (RTP), other electronic circuitry suitable for the retrieval and execution instructions stored on a machine-readable storage medium, or a combination thereof.

As used herein, "signal communication" refers to electric communication such as hardwiring two components together or wireless communication, as understood by those skilled in the art. For example, wireless communication may be Wi-Fi®, Bluetooth®, ZigBee, or forms of near-field communications. In addition, signal communication may include one or more intermediate controllers or relays disposed between elements in signal communication.

As note, the memory 306 may store instructions, such as survey and image capture instructions 308. The survey and image capture instructions 308 may prompt or initiate capture of depth of survey measurements. Such a prompt may be transmitted to the user interface 318. In another embodiment, the prompt may be transmitted to another computing device. In another embodiment, the survey and image capture instructions 308, when executed, may cause the controller 302 to initiate a survey, for example, via an inline inspection tool or assembly and/or via an unmanned vehicle. The survey and image capture instructions 308 may also prompt or initiate capture of baseline images. Such a prompt may also be transmitted to the user interface 318. In another embodiment, the prompt may be transmitted to another computing device and/or to a controlled unmanned vehicle (the image sensor 314 disposed therein and to capture one or more images along the right-of-way).

The memory 306 may store instructions, such as baseline modeling instructions 310. The baseline modeling instructions 310 may utilize the data gathered based on execution of the survey and image capture instructions 308. The baseline modeling instructions 310 may, after receiving such data, render a three dimensional elevation model, based on the baseline images. The baseline modeling instructions 310 may utilize a photogrammetry algorithm and/or other models to generate the three dimensional elevation model. For example, the baseline modeling instructions 310 may additionally use optic methods, projective geometry, and/or other computational models. The resulting three dimensional elevation model may comprise an accurate representation of actual conditions at the right-of-way. In another embodiment, the baseline modeling instructions 310 may georeference the three dimensional elevation model using, for example, known locations and/or known coordinates. The baseline modeling instructions 310 may also georeferenced the depth of coverage measurements. Finally, the baseline modeling instructions 310 may add the depth of coverage measurements to the three dimensional elevation model.

The memory 306 may store instructions, such as depth of coverage modeling instructions 312. The depth of coverage modeling instructions 312 may utilize the baseline three dimensional elevation model, as well as subsequently captured images. The depth of coverage modeling instructions 312 may render an updated three dimensional elevation model. The depth of coverage modeling instructions 312 may then determine a delta depth of coverage based on the updated three dimensional elevation model and the baseline three dimensional model.

Figure 4:
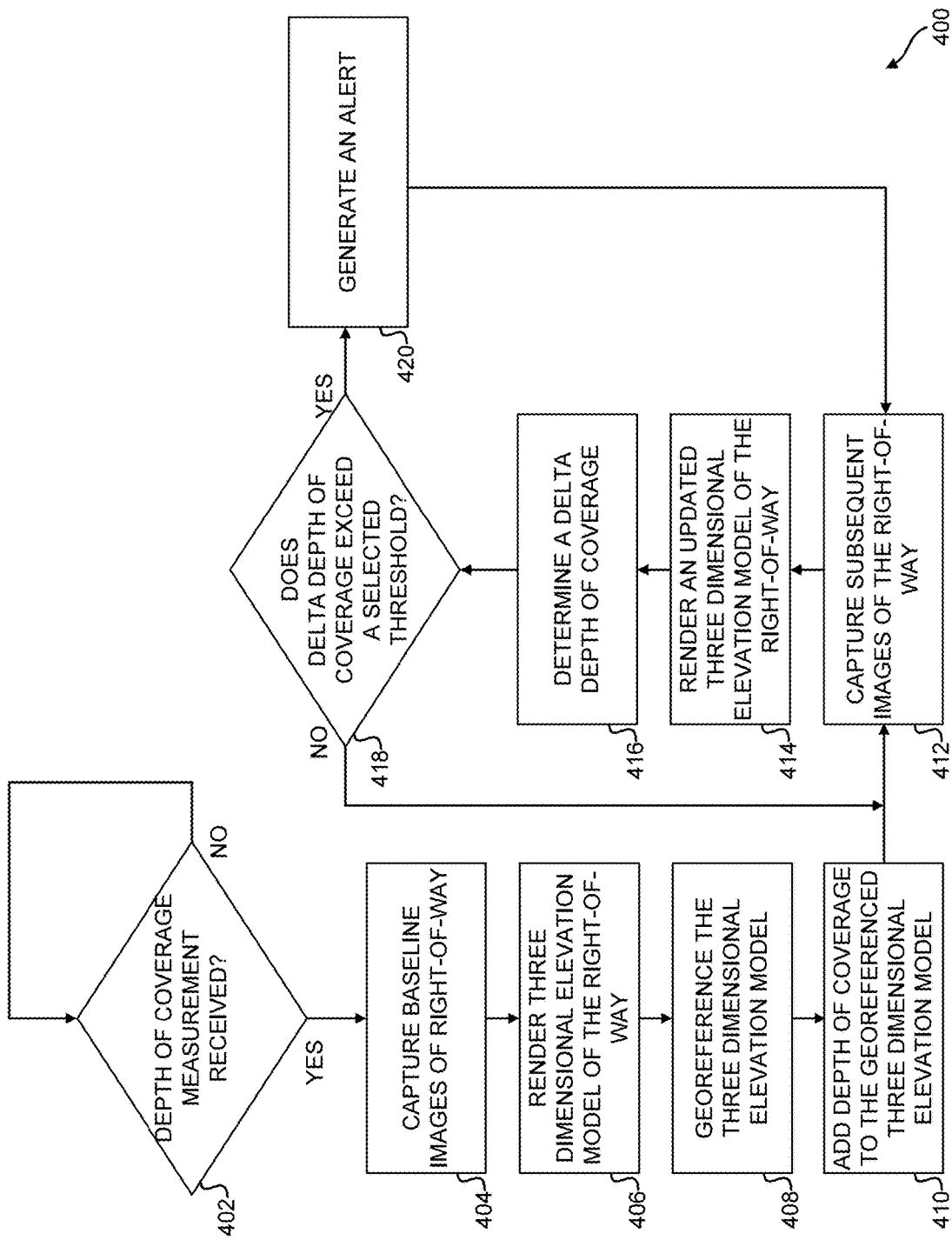
FIG. 4 is a simplified flow diagram for determining a depth of coverage for a right-of-way, according to an embodiment of the disclosure.

FIG. 4 is a simplified flow diagram for determining a depth of coverage for a right-of-way, according to an embodiment of the disclosure. Unless otherwise specified, the actions of method 400 may be completed within controller 302. Specifically, method 400 may be included in one or more programs, protocols, or instructions loaded into the memory of controller 302 and executed on the processor or one or more processors of the controller 302. In other embodiments, method 400 may be implemented in or included in components of FIGS. 1-3. The order in which the operations are described is not intended to be construed as a limitation, and any number of the described blocks may be combined in any order and/or in parallel to implement the methods.

At block 402, controller 302 may determine whether a depth of cover or a depth of coverage measurement has been received. In other embodiments, the controller 302 may initiate capture or actual measurement of the depth of cover for a right-of-way, using one or more automated components and/or apparatus. If no depth of cover or coverage measurement has been received, then the controller 302 may wait until the depth of cover or coverage measurement has been received.

At block 404, if the depth of cover or coverage has been received by the controller 302, then the controller may capture baseline images of a right-of-way. In an embodiment, the controller 302 may prompt an automated vehicle to capture such baseline images. In another embodiment, the controller 302 may prompt a user or technician to obtain or capture the baseline images. In an embodiment, capture of the baseline images may occur within a selected time from the reception or capture of the depth of cover or coverage measurement. Such a selected time may ensure that the resulting three dimensional elevation model accurately captures the current condition of the right-of-way.

At block 406, the controller 302 may render a three dimensional elevation model of the right-of-way based on the baseline images. The controller 302 may utilize photogrammetry techniques. In another embodiment, the controller 302 may utilize other algorithms, such as light detection and ranging (LiDAR) algorithms, photoclinometry (for example, using shadows cast by nearby objects to generate a three dimensional elevation model), an interpolation algorithm (for example, using known points to estimate elevation), and/or other algorithms. The use of such algorithms may ensure that accurate three dimensional representation of the actual landscape is generated and based on the baseline images.

At block 408, the controller 302 may georeference the three dimensional elevation model. In such embodiments, the controller 302 may utilize various mathematical formula and/or computational algorithm to georeference the three dimensional elevation model.

At block 410, the controller 302 may add the depth of cover or coverage measurement (for example, depth of soil coverage) to the georeferenced three dimensional elevation model. At block 412, the controller 302 may capture subsequent images of the right-of-way based on a second selected time. The controller 302, in such examples, may initiate an unmanned vehicle to capture the subsequent images. In another example, the controller 302 may prompt a user to capture the subsequent images. In an embodiment, the first georeferenced three dimensional elevation model of a selected area may be considered a baseline depth of soil coverage model.

At block 414, the controller 302 may render an updated three dimensional elevation model of the right-of-way. At block 416, the controller 302 may determine a delta depth of coverage (for example, soil coverage) using the updated three dimensional elevation model and the baseline three dimensional elevation model. In an embodiment, the controller 302 may subtract the values included in the updated three dimensional elevation model from the corresponding values in the baseline. In another embodiment, the controller 302 may compare each three dimensional elevation model to determine the delta depth of coverage.

At block 418, the controller 302 may determine whether delta depth of cover or coverage exceeds threshold. If the delta depth of cover or coverage does not exceed the threshold, controller 302 may capture additional images and proceed to determine a new delta depth of coverage. If At block 420, If the delta depth of cover or coverage does exceed the threshold, then the controller 302 may generate an alert. In an embodiment, the threshold may include a variable length or depth or other measurement. Such a variable length may be based on a location of the pipeline or underground feature, an environment surrounding the surface above the pipeline or underground feature, and/or the type of underground feature (for example, a pipeline, utility line, sewage or septic line or tank, tunnels, and/or other various underground features).

Figure 5A:
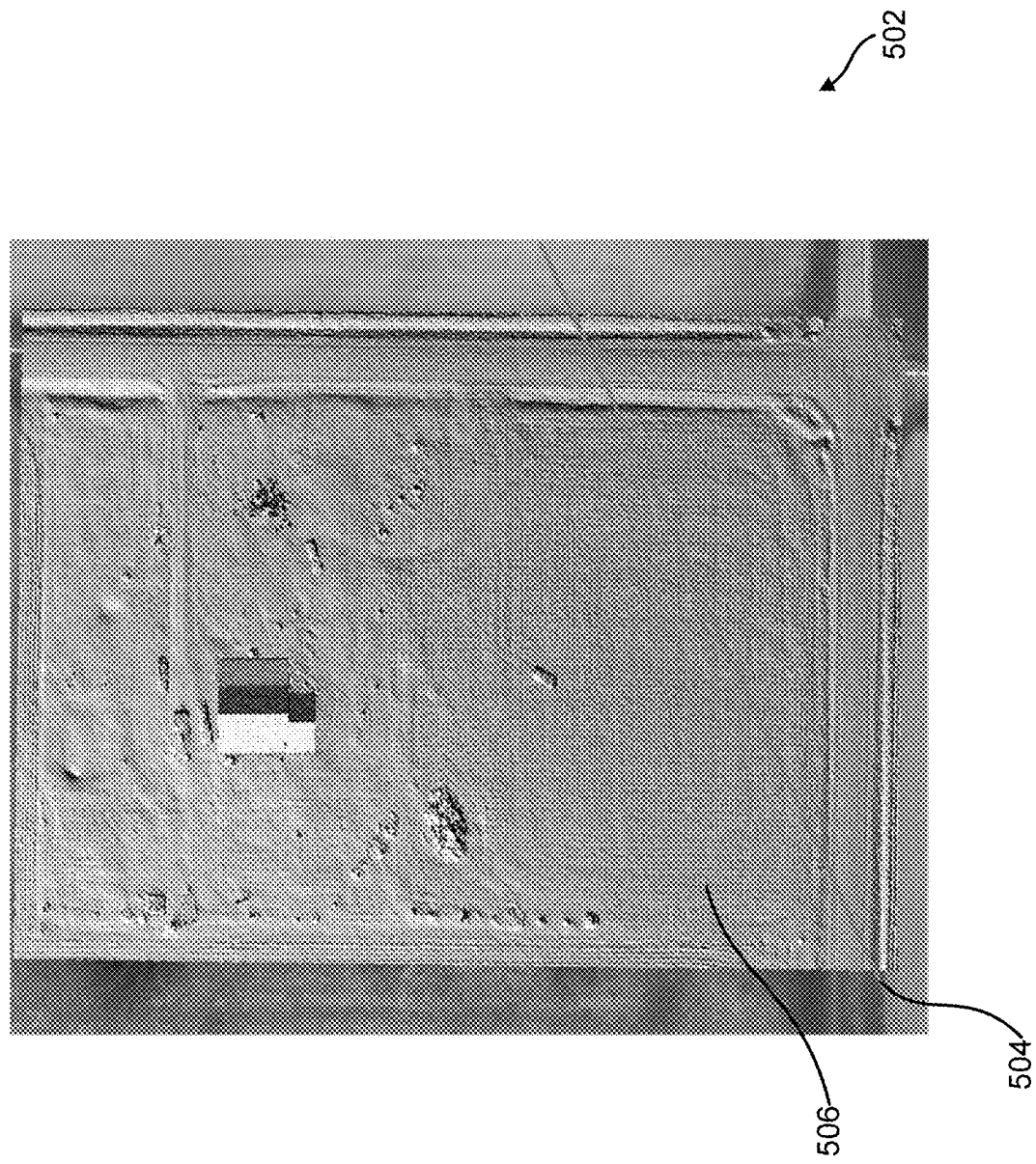
FIG. 5A, FIG. 5B, and FIG. 5C are examples of a three dimensional elevation model, according to an embodiment of the disclosure.

FIG. 5A is an example of a three dimensional elevation model 502, according to an embodiment of the disclosure. In such an embodiment, the three dimensional elevation model may include geographical features within a preselected distance of the right-of-way 504. In other embodiments, actual values may be overlayed onto certain elevations and/or features. In particular for elevations and/or features near the right-of-way, the overlayed values may indicate a current depth of coverage. Further, the overlayed values may be colored, each color indicating a severity level (for example, green means good, yellow means potential issues, red means actual issues occurring). Other data may be included in the three dimensional elevation model, such as coordinates and/or identification of varying issues (such as highlighting areas with high risk of potential exposure due to erosion, degradation, weather events, landslides, flooding, sinkholes, and/or other event).

Figure 5B:
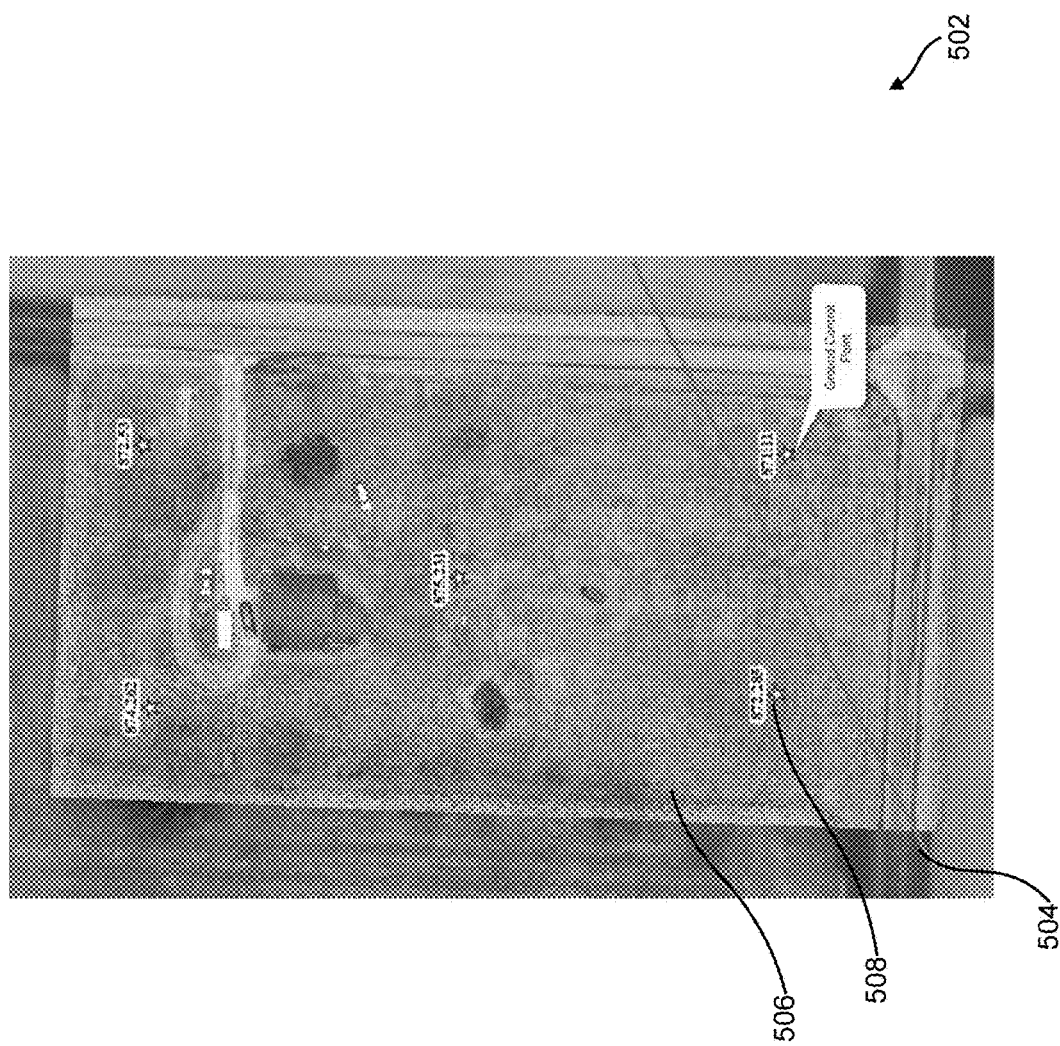
Figure 5C:
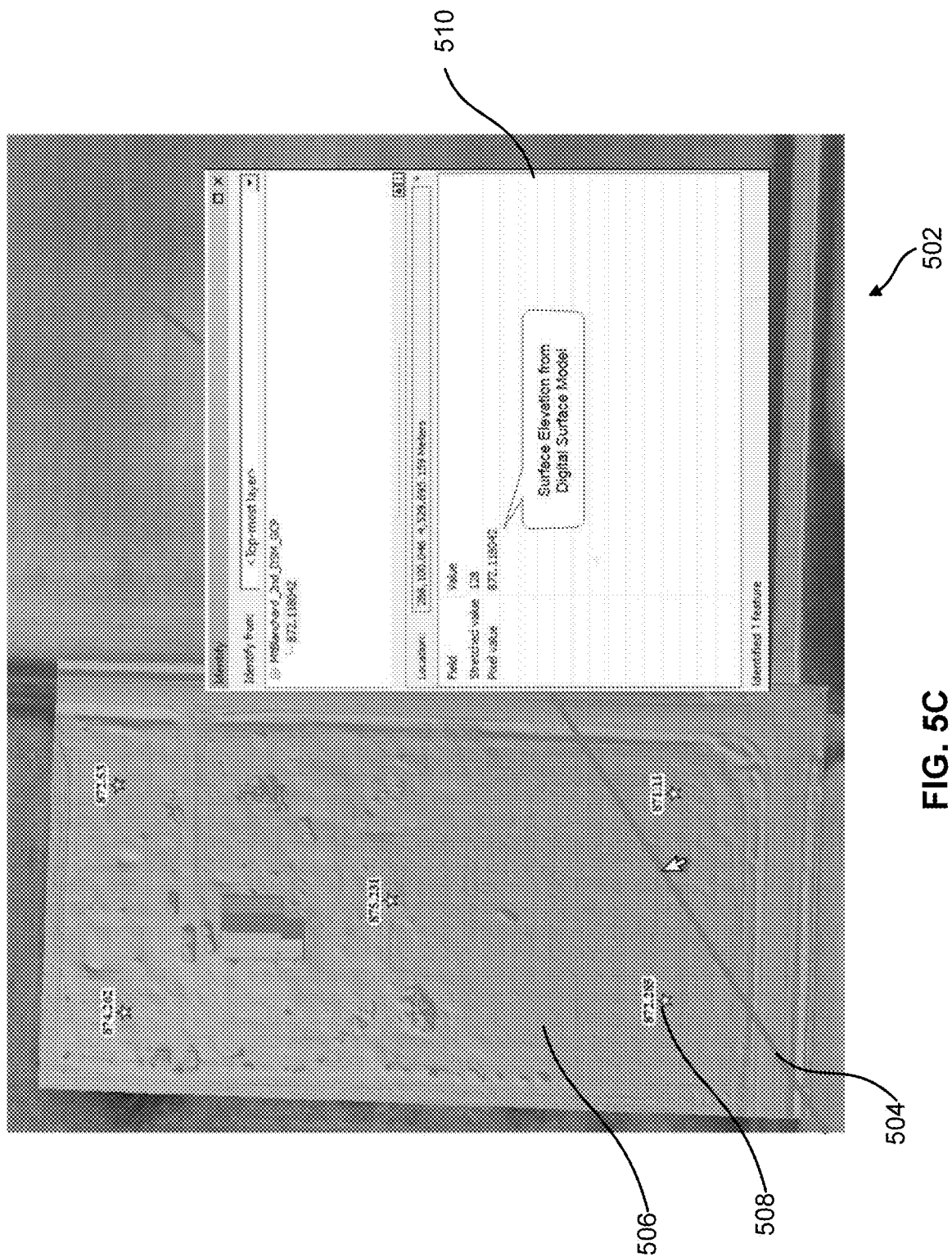

FIG. 5B and FIG. 5C are other examples of a three dimensional elevation model 502, according to an embodiment of the disclosure. In an embodiment, the three dimensional elevation model 502 may include ground control points 508. The ground control points 508 may be determined based on metadata included in the capture images. Further, the ground control points 508 may include known points including visible objects (for example, an aerial marker, waterway crossing, edge of road crossings, an encumbrance, and/or above grade features or pipeline features). The ground control points 508 may provide a highly accurate benchmark measurement to improve the overall accuracy of surrounding elevation data. In another embodiment, a user may select a ground point to view the surface elevation for a particular ground control point via a separate user interface.

The present application claims priority to and the benefit of U.S. Provisional Application No. 63/540,822, filed Sep. 27, 2023, titled "SYSTEMS AND METHODS TO DETERMINE DEPTH OF SOIL COVERAGE ALONG A RIGHT-OF-WAY," U.S. Provisional Application No. 63/540,692, filed Sep. 27, 2023, titled "SYSTEMS AND METHODS TO DETERMINE VEGETATION ENCROACHMENT ALONG A RIGHT-OF-WAY," and U.S. Provisional Application No. 63/539,039, filed Sep. 18, 2023, titled "SYSTEMS AND METHODS TO DETERMINE DEPTH OF SOIL COVERAGE ALONG A RIGHT-OF-WAY," the disclosures of which are incorporated herein by reference in their entirety.

Although specific terms are employed herein, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A method to determine depth of soil coverage for a pipeline along a pipeline right-of-way, the method comprising:
    receiving a right-of-way walking survey for the pipeline right-of-way, the right-of-way walking survey includes a depth of soil coverage over the pipeline for the pipeline right-of-way;
    capturing baseline images of the pipeline right-of-way within a first selected time of the right-of-way walking survey;
    rendering a three dimensional elevation model of the pipeline right-of-way from the baseline images;
    georeferencing the three dimensional elevation model to generate a georeferenced three dimensional elevation model;
    superimposing the depth of soil coverage on the georeferenced three dimensional elevation model;
    capturing subsequent images of the pipeline right-of-way after a second selected time;
    rendering an updated three dimensional elevation model of the pipeline right-of-way from the subsequent images; and
    determining a delta depth of soil coverage of the pipeline based on the georeferenced three dimensional elevation model and the updated three dimensional elevation model.

2. The method of claim 1, wherein the right-of-way walking survey comprises a survey grade quality and includes one or more of latitude, longitude, elevation, depth of soil coverage from a top of the pipeline to a surface of the pipeline right-of-way, XY coordinates, Z coordinates, or a measurement process.

3. The method of claim 1, wherein the delta depth of soil coverage comprises an actual depth of soil coverage within about 3 centimeters.

4. The method of claim 1, further comprising:
    determining whether the delta depth of soil coverage exceeds a selected threshold; and
    in response to a determination that the delta depth of soil coverage exceeds the selected threshold, generating an alert.

5. The method of claim 4, wherein the selected threshold comprises a variable length based on a location of the pipeline and an environment surrounding of the pipeline.

6. The method of claim 4, wherein the alert includes one or more of the delta depth of soil coverage, a previous depth of soil coverage, the selected threshold, a location of the pipeline right-of-way where the delta depth of soil coverage, a severity level, or a next action, and wherein the next action includes one or more of adjustment of a current depth of soil coverage, adjustment of pipeline depth, or installation of pipeline protection.

7. The method of claim 1, further comprising:
    updating the georeferenced three dimensional elevation model with the updated three dimensional model.

8. The method of claim 7, wherein an updated georeferenced three dimensional elevation model includes one or more of symbols or colors indicating a change in the depth of soil coverage and a severity of the change.

9. The method of claim 1, wherein the second selected time comprises a time based on a location of the pipeline and an environment surrounding of the pipeline.

10. The method of claim 9, wherein capture of second subsequent images occurs based on the second selected time and the delta depth of soil coverage.

11. The method of claim 1, further comprising:
verifying the delta depth of soil coverage at a portion of the pipeline right of way via a second right-of-way walking survey.

12. The method of claim 1, wherein the baseline images and the subsequent images comprise high resolution aerial images captured by an image sensor on one of an unmanned aerial vehicle or a manned aerial vehicle.

13. A method to determine depth of soil coverage for an underground feature along a right-of-way, the method comprising:
capturing images of the right-of-way after a selected time;
rendering an updated three dimensional elevation model of the right-of-way from the images;
determining a delta depth of soil coverage of the underground feature based on a georeferenced three dimensional elevation model and the updated three dimensional elevation model; and
superimposing a depth of soil coverage and the delta depth of soil coverage on the updated three dimensional elevation model.

14. The method of claim 13, further comprising:
receiving a depth of cover measurement from ground level for the right-of-way;
capturing baseline images of the right-of-way within a prior selected time of reception of the depth of cover measurement;
rendering a three dimensional elevation model of the right-of-way from the baseline images;
georeferencing the three dimensional elevation model to generate the georeferenced three dimensional elevation model; and
superimposing the soil coverage to the georeferenced three dimensional elevation model.

15. The method of claim 14, wherein the depth of cover measurement is received from one or more of a walking survey, original construction records, or via inline inspection.

16. The method of claim 13, wherein the underground feature comprises a pipeline, a utility line, or a septic system.

17. The method of claim 16, wherein, if the underground features comprises a pipeline, the pipeline facilitates transport of hydrocarbon fluids.

18. The method of claim 13, further comprising:
in response to the delta depth of soil coverage being outside of a threshold range, generating an alert to include an indication of an area with a depth of soil coverage below a selected limit.

19. The method of claim 18, wherein the selected limit is based on a type of the underground feature.

20. The method of claim 18, wherein the alert is superimposed on the updated three dimensional model.

21. The method of claim 18, wherein the alert includes a remedial action, and wherein the remedial action includes one or more of adding surface coverage over the underground feature or lowering the underground feature further below ground.

22. A computing device for determining depth of soil coverage for a pipeline along a pipeline right-of-way, the computing device comprising a processor and a non-transitory computer-readable storage medium storing software instructions that, when executed by the processor:
in response to reception of (a) a right-of-way walking survey for the pipeline right-of-way including a depth of soil coverage over the pipeline for the pipeline right-of-way and (b) captured baseline images of the pipeline right-of-way within a first selected time of the right-of-way walking survey, render a three dimensional elevation model of the pipeline right-of-way from the captured baseline images;
georeference the three dimensional elevation model to generate a georeferenced three dimensional elevation model;
add the soil coverage to the georeferenced three dimensional elevation model;
capture subsequent images of the pipeline right-of-way after a second selected time;
render an updated three dimensional elevation model of the pipeline right-of-way from the subsequent images; and
determine a delta depth of soil coverage of the pipeline based on the georeferenced three dimensional elevation model and the updated three dimensional elevation model.

23. The computing device of claim 22, wherein the non-transitory computer-readable storage medium further stores software instructions that, when executed by the processor:
integrate the delta depth of soil coverage of the pipeline into the updated three dimensional elevation model.

24. The computing device of claim 23, wherein the non-transitory computer-readable storage medium further stores software instructions that, when executed by the processor:
determine an indicator for each section of the updated three dimensional elevation model based on the delta depth of soil coverage and a selected threshold for each section.

25. The computing device of claim 24, wherein the selected threshold comprises a value based on one or more of a location of the pipeline right-of-way or an environment of the pipeline right-of-way.

* * * * *